United States Patent [19]

Druet

[11] 4,375,770
[45] Mar. 8, 1983

[54] RELEASABLE SCREW AND NUT BEARING MECHANISM

[75] Inventor: Clair Druet, Brison Saint-Innocent, France

[73] Assignee: La Technique Integrale, Societe Anonyme Francaise, Chambery, France

[21] Appl. No.: 185,574

[22] Filed: Sep. 9, 1980

[30] Foreign Application Priority Data

Sep. 11, 1979 [FR] France ................... 79 22658

[51] Int. Cl.³ .................. F16H 1/18; F16H 55/17
[52] U.S. Cl. ............... 74/424.8 A; 74/424.8 C; 74/459
[58] Field of Search ............ 411/433; 74/424.8 R, 74/424.8 A, 424.8 C, 424.8 NR, 459

[56] References Cited

U.S. PATENT DOCUMENTS

| 1,535,135 | 4/1925 | Rodel ............................... 74/459 |
| 2,393,764 | 1/1946 | Frank ........................ 74/424.8 A |
| 2,770,155 | 11/1956 | Morgan ....................... 74/459 X |
| 3,004,445 | 10/1961 | Mondon ................. 74/424.8 R X |
| 3,173,304 | 3/1965 | Strandgren ................... 74/459 |
| 3,595,094 | 7/1971 | Lemor ....................... 74/459 X |
| 3,774,332 | 7/1973 | Nilsson ..................... 74/424.8 C |
| 3,884,090 | 5/1975 | Dock ......................... 74/424.8 C |

FOREIGN PATENT DOCUMENTS

| 1077028 | 3/1960 | Fed. Rep. of Germany ..... 74/424.8 A |
| 1221338 | 1/1960 | France ........................ 74/424.8 R |
| 47-20530 | 6/1972 | Japan ............................ 411/433 |
| 1270240 | 4/1972 | United Kingdom ............... 411/433 |
| 178261 | 1/1966 | U.S.S.R. ..................... 74/424.8 R |
| 484345 | 1/1976 | U.S.S.R. ..................... 74/424.8 C |

Primary Examiner—Thomas J. Holko

[57] ABSTRACT

This releasable screw and nut bearing mechanism comprises an internal central screw, a coaxial external nut constituting a socket made of several segments, the outer diameter of the screw being smaller than the inner diameter of the socket in order to provide a free gap therebetween in which a plurality of angularly spaced planet rolling members are disposed and adapted to mesh both with said screw and with said socket, this assembly being releasable by moving the socket segments radially outwards in order to free the screw from any meshing engagement with the rolling members, at any time, irrespective of the relative angular positions between the screw, the socket and the rolling members. Spring means may be provided for constantly urging the rolling members away from the screw, and cage means are provided for guiding the rolling members both axially and radially.

6 Claims, 14 Drawing Figures

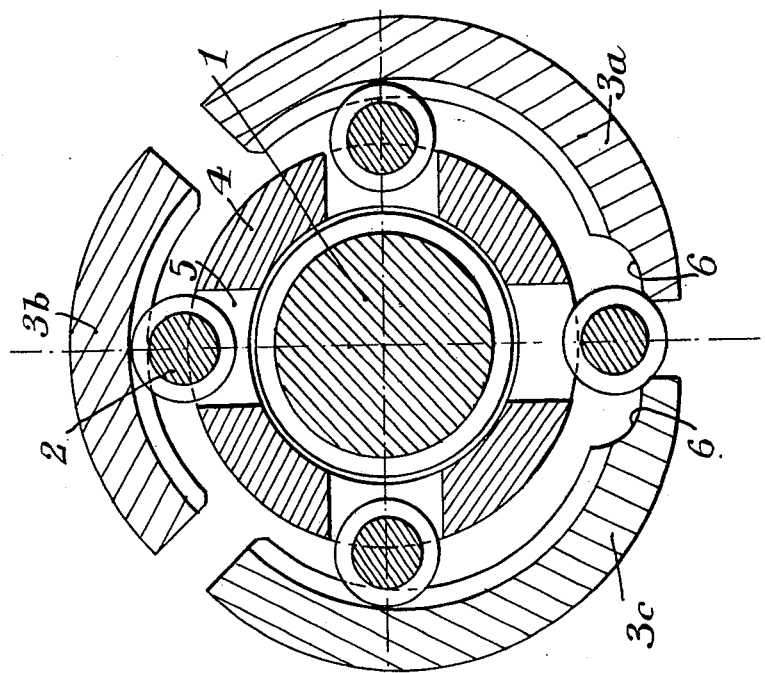
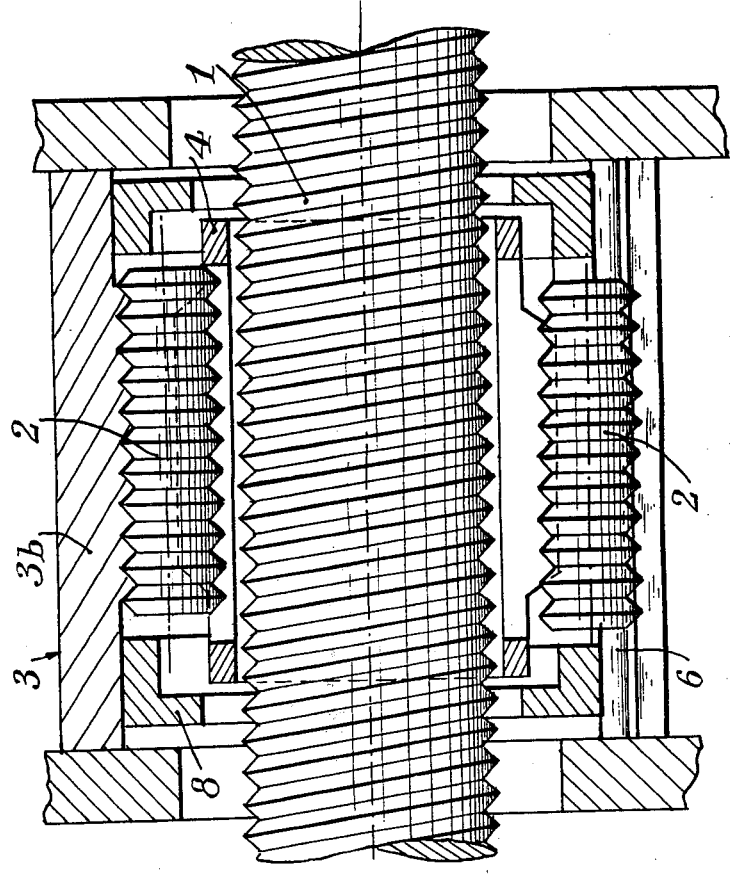

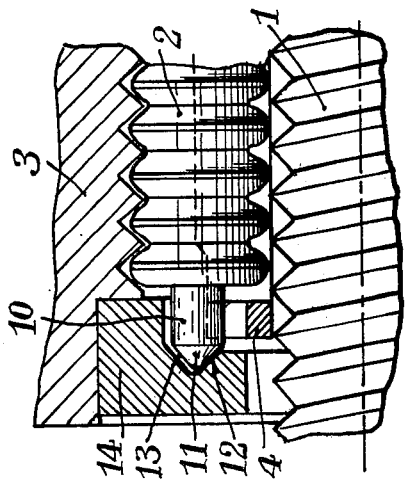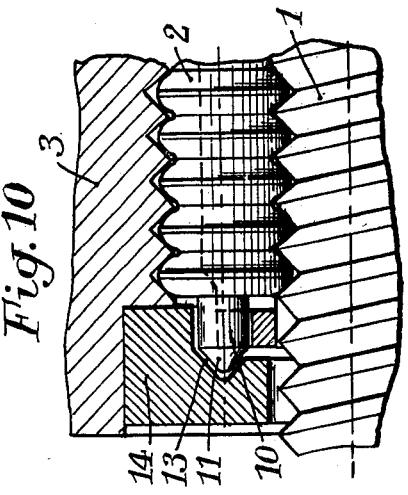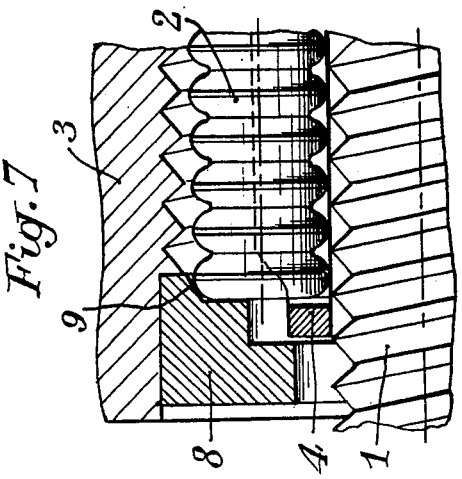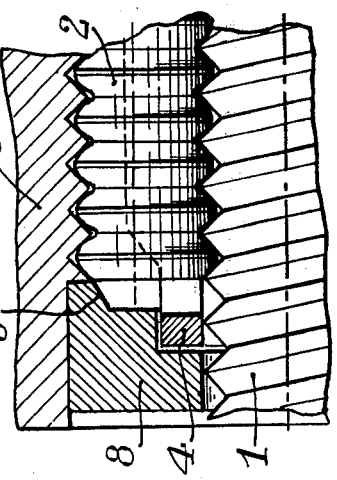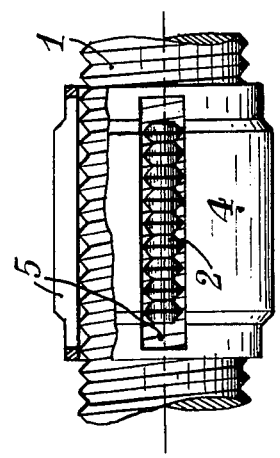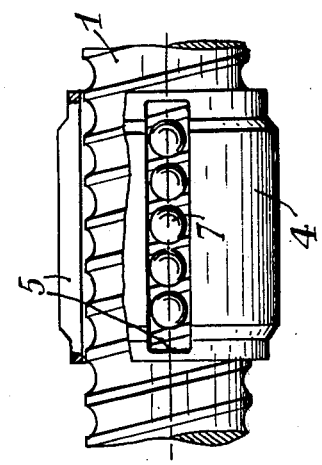

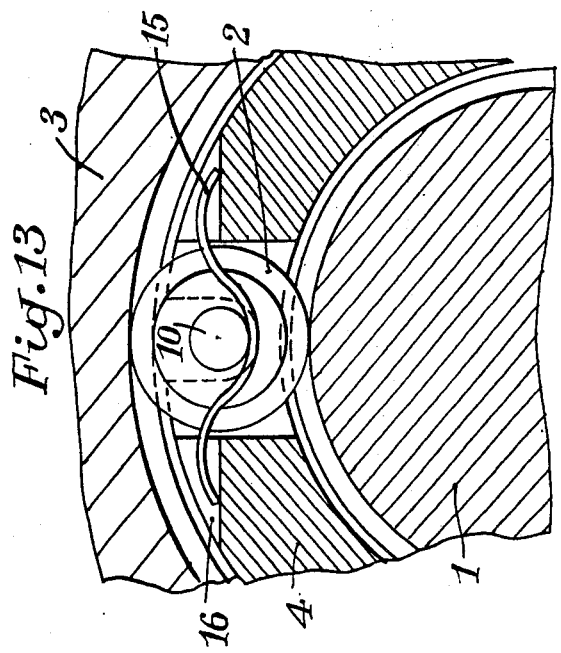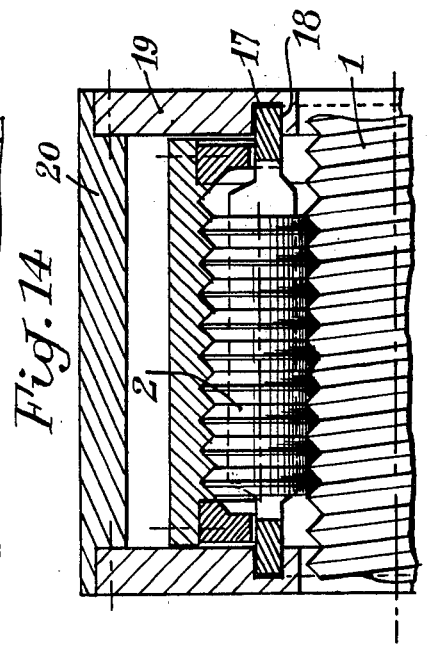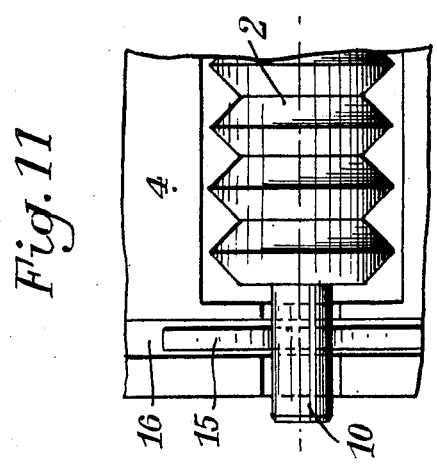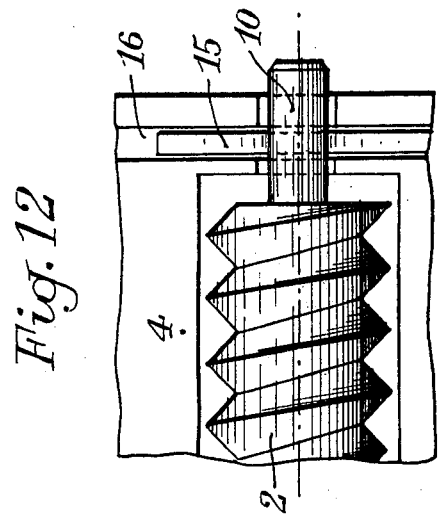

RELEASABLE SCREW AND NUT BEARING MECHANISM

BACKGROUND OF THE INVENTION

This invention relates in general to screw and nut mechanisms and has specific reference to a releasable mechanism of this type.

Screw and nut mechanisms of the bearing type comprise as a rule an internal screw, a coaxial external nut or socket, the outer diameter of said screw being smaller than the inner diameter of the nut so as to provide therebetween a free annular gap in which rolling members such as planet rollers or balls whether screw-threaded or formed with annular grooves are provided, said rollings members engaging simultaneously the screw threads and the nut threads, so that the relative rotation of the screw in the nut will produce rolling frictional contacts and thus reduce sliding contacts to a nearly negligible value.

These known mechanisms comprise of course suitable means for recycling the rollers or balls and restoring them to their initial position when the relative angular movement of the screw in the nut or socket has caused an axial movement of the balls or rollers equal to one screw pitch.

SUMMARY OF THE INVENTION

It is the essential object of the present invention to provide a screw and nut bearing mechanism of the type broadly disclosed hereinabove which is characterized essentially in that it is releasable, that is, so designed that the screw can be freed of any meshing engagement with the rolling members at any time, irrespective of the momentary relative angular position between the screw, the socket and the rolling members; in this "released nut" condition the screw is thus free to move axially in relation to the socket and rolling members, independently of any movement of rotation, or any absence of movement, of the socket and of the rolling members with respect to the screw.

Furthermore, the screw and nut bearing mechanism according to the present invention is such that at the end of any axial movement of the screw released from the nut the screw can be re-engaged with the nut and thus resume at any time the screw and nut bearing operation. This possibility of releasing the screw from the nut is particularly advantageous when, for example, the screw and nut mechanism being operated at a low feed rate, it is desired to produce a fast-rate return stroke normally incompatible with the characteristics of the screw and nut bearing function, or vice versa; with this arrangement, it is also possible, if the mechanism is operated in a vertical position, to release the screw by gravity when the screw is disengaged from the nut, and to subsequently raise the screw by operating the mechanism in the screw and nut fashion, a feature particularly valuable from the standpoint of safety in certain applications.

To permit this screw release, the socket or nut of the mechanism is made of a plurality of preferably identical elements or segments in combination with means adapted to move said elements radially outwards at any time, whether said elements are rotating or stationary, to an extent sufficient for the purpose and preferably the same for each of them.

However, said rolling members must remain in a relative position such that at any time they can re-engage the screw threads and the socket inner threads or inner circular grooves, in order to restore the screw and nut operation when a reverse control action is effected in order to move the various component elements or sections of the nut or socket radially inwards, i.e. towards the screw axis.

For this purpose, the rolling members are placed in apertures formed in a cage so as to be constantly held in a same relative angular position corresponding to the normal screw and nut operation; these apertures are such that they permit on the one hand a radial outward movement of the rolling members received therein, without allowing them to escape from the cage, this movement being sufficient for releasing the rolling members from any driving engagement with the screw threads, and on the other hand an axial movement of said rolling members in said apertures to an extent at least equal to one pitch of said screw threads, to permit the translation of said rolling members in one direction, as a consequence of the angular movement of the screw in said socket, and in the opposite direction for recycling said rolling members when they are in proper alignment with recesses provided for this purpose in the socket and having a bottom free of any threads or circular grooves, according to the known arrangement.

In conventional screw and nut bearing mechanisms, the cage maintaining the desired relative angular spacing between the rollers or balls is centered as a consequence of its contact with the socket, or, more accurately stated, with a non-threaded or plain portion of this socket. Thus, the cage is also centered in relation to the screw. However, in the device of this invention the socket consists of a plurality spaced of segments or like elements adapted to be spread apart radially for releasing the rolling members, so that after this outward movement and the screw release resulting therefrom, the cage is no more centered and therefore likely to engage the screw and thus prevent the free fall thereof by gravity.

To avoid this inconvenience, in the mechanism of the present invention the cage is centered in relation to the screw and to this end the complete releasable screw and nut bearing mechanism is housed in a casing permitting the radial movement of the socket segments, possibly together with means for controlling this movement, and both screw and cage are centered in relation to this casing.

THE DRAWINGS

FIGS. 3 and 4 are views similar to FIGS. 1 and 2, respectively, showing the mechanism in its released condition;

FIGS. 5 and 6 are front elevational views with parts broken away, showing on a smaller scale the screw and the cage containing a roller (FIG. 5) and balls (FIG. 6), the socket being omitted for the sake of clarity;

FIGS. 7 and 8 are fragmentary sections showing on a larger scale the mechanism in its released condition (FIG. 7) and in its engaged condition (FIG. 8), with a device for restoring the mutual engagement between the rolling members and the socket when restoring the operation of the mechanism;

FIGS. 9 and 10 are views similar to FIGS. 7 and 8, respectively, showing a modified form of embodiment;

Figure 2:
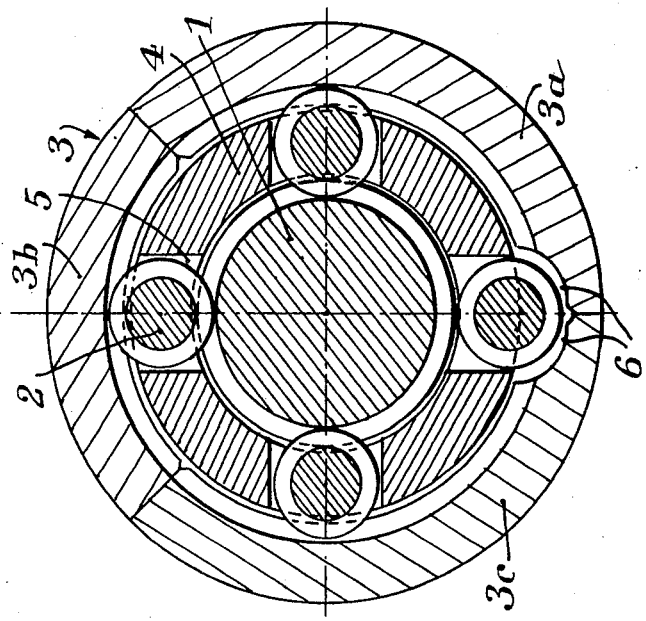
FIG. 2 is a section taken along the line II—II of FIG. 1.
Figure 1:
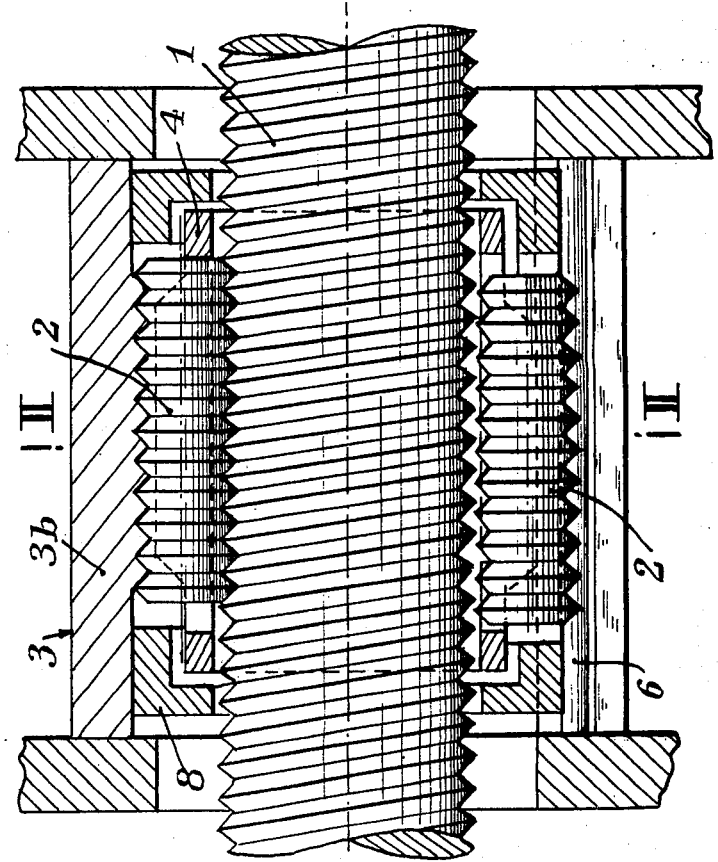
FIG. 1 is a longitudinal axial section showing a releasable screw and nut bearing mechanism constructed according to the teachings of this invention.

FIGS. 11, 12 and 13 are fragmentary views showing on a still larger scale a front view (FIGS. 11 and 12), and an end view (FIG. 13) of a modified form of embodiment directed to facilitate the release of the rolling members, with circular grooves in the first case and screw threads in the other case, and FIG. 14 is a longitudinal axial section showing on a smaller scale a mechanism according to any of the preceding examples, in which the cage is constantly centered in relation to the screw.

DESCRIPTION OF THE PREFERRED EMBODIMENTS

The releasable screw and nut bearing mechanism illustrated in the drawings comprises a central screw 1 the threads of which are adapted to be engaged by circular grooves formed on a number of rollers 2 disposed at spaced angular intervals around the screw and meshing in turn with circular internal grooves formed on the nut or socket 3 consisting of three segments 3a, 3b and 3c adapted to move radially in relation to said screw 1.

These rollers 2 are held in proper angular positions by a cage 4 formed with corresponding apertures 5 in which they are movable not only radially but also, within predetermined limits, axially.

The inner surface of socket 3 comprises a number of recesses 6 the bottom of which is not provided with circular grooves, in order to permit in the manner known per se the recycling of the rollers or balls when they have been moved longitudinally to an extent corresponding to the pitch of screw 1, so as to be restored to their initial position.

These recesses 6 are located preferably at right angles with the joints formed between the segments 3a, 3b and 3c constituting the socket 3.

FIGS. 5 and 6 illustrate more clearly the manner in which these rollers 2 or balls 7 are retained in the apertures 5 of cage 4.

FIGS. 7 to 10 illustrate two ways of holding the rollers 2 in engagement with the grooves of nut or socket 3 in the release position of the mechanism, as shown in FIG. 7 for one way, and in FIG. 9 for the other way.

The end portion of each socket segment 3 comprises an insert 8 having a cam face 9 formed therein which constitutes the extension of the surface of same inclination of the endmost groove formed in the socket 3. Thus, when re-engaging the drive through the mechanism by causing the centripetal movement of the socket segments and of said insert 8, the cam face 9 will cooperate with the endmost rib of each roller 2 in order to cause this rib to penetrate into the corresponding groove of socket 3.

In the modified form of embodiment illustrated in FIGS. 9 and 10, coaxial stub shafts 10 formed at the ends of each roller 2 have a tapered tip 11 cooperating with the surface 12 of a bearing cavity 13 formed in the corresponding insert 14 rigid with socket 3, in order to hold the threads or grooves of rollers 2 in constant engagement with the relevant threads of socket 3.

To facilitate the centrifugal radial movement of rollers 2 when releasing the socket 3, the end tips 10 of the rollers may be urged in this outward direction by spring blades 15 fitted in grooves 16 formed for this purpose in cage 4. Thus, these spring blades 15 will constantly urge the threads or circular grooves of rollers 2 for proper engagement with the internal threads or circular grooves formed in socket 3, or at least clear said rollers from the threads of the central screw 1.

To prevent the cage 4 of rollers 2 or balls 7 from engaging the screw 1 in the released position of said rollers 2, this cage 4 may be provided at either end with a ring-shaped projection 17 guided in a corresponding groove 18 formed in the end flanges 19 of a casing 20 enclosing the releasable screw and nut mechanism, this casing having also mounted therein the means necessary for controlling the radial movements of the segments 3a, 3b and 3c of socket 3 during the release step.

Of course, the various forms of embodiment described hereinabove with reference to the accompanying drawings are given by way of example, not of limitation, and therefore many modifications and changes may be brought thereto without departing from the basic principles of the invention. Thus, more particularly, the number of rollers 2 may be other than four and the number of segments constituting the socket 3 may be other than three; besides, the profiles of the screw threads, both internal and external, may differ from the profiles shown in the drawings; similarly, the number of recesses formed in socket 3 for recycling the rollers may be greater than one and these recesses may be disposed if desired at locations other than across the joint between the socket segments, and finally the means (not shown) for controlling the engagement and release of the screw 1 in relation to the segments constituting the socket 3 may be of any suitable and known type, since they are no part of the present invention.

What is claimed as new is:

1. A releasable screw and nut bearing mechanism comprising a central internal threaded screw, an external nut coaxial therewith and provided with internal threads or circular grooves forming a socket, the outer diameter of the screw being smaller than the inner diameter of the nut in order to provide a free annular gap therebetween, a plurality of rolling members provided with threads or circular grooves on their outer peripheral surfaces disposed at spaced angular intervals in said annular gap and in engagement simultaneously with the external threads of the screw and the internal threads or grooves of the socket, means for recycling the rolling members to bring them into their original position when the relative angular movement of the screw in the socket has caused an axial movement of said rolling members equal to a thread of the screw, said socket comprising segments adapted to move radially apart to a disengaged position wherein the screw is free from any engagement with said rolling members at any time, whether the mechanism is stationary or rotating indifferently in one or the other direction, irrespective of the axial load applied thereto, and means which automatically cause re-engagement of the rolling members with the screw and the socket when the component parts of the socket are brought by axial centripetal movement to an initial operating position.

2. Mechanism as claimed in claim 1, comprising rolling members disposed in apertures formed in a one-piece cage, wherein said apertures are so dimensioned in relation to said rolling members that said rolling members are movable axially therein to an extent corresponding to at least one pitch of the screw threads and thus permit the translation of said rolling members in a direction responsive to the angular movement of the screw in said socket, and, in the opposite direction, for recycling said rolling members when said rolling members lie normally to corresponding recesses formed in said socket.

3. Mechanism as claimed in claim 2, wherein the end of each socket segment comprises an end insert having a cam face formed therein which constitutes the extension of the surface of the endmost groove formed in said socket, said cam face being adapted, when re-engaging the mechanism as a consequence of the centripetal movement of said socket segments and the inserts thereof, to co-operate with the endmost circular rib of said rolling members in order to cause said endmost circular rib to re-engage the matching circular groove of said socket.

4. Mechanism as claimed in claim 3, wherein said rolling members are each formed with end stub shafts having each a tapered tip adapted to co-operate with a corresponding surface portion of a bearing cavity formed in said end insert rigid with said socket, in order to hold the grooves and threads of said rolling members in proper engagement with the threads or grooves of said socket.

5. Mechanism as claimed in claim 4, wherein the ends of said cage are each provided with a groove adapted to receive a spring blade so prestressed and positioned as to constantly urge the end stub shafts of said rolling members radially outwards in the disengaged position of said socket.

6. Mechanism as claimed in claim 5, wherein, to prevent said cage from contacting the screw when releasing the rolling members, said cage is provided at either ends with a ring-like member slidably fitted in a guide groove of corresponding dimensions formed in the end flanges of a casing enclosing the releasable screw and nut bearing mechanism and also adapted to enclose the means for controlling the axial movements of the component elements of said socket during the disengaged position.

* * * * *

UNITED STATES PATENT AND TRADEMARK OFFICE
CERTIFICATE OF CORRECTION

PATENT NO. : 4,375,770
DATED : March 8, 1983
INVENTOR(S) : CLAIR DRUET

It is certified that error appears in the above-identified patent and that said Letters Patent are hereby corrected as shown below:

[56] References Cited
U.S. Patent Documents

Correct "3,774,332" to read --3,744,332--.

Signed and Sealed this

Twenty-second Day of January 1985

[SEAL]

*Attest:*

DONALD J. QUIGG

*Attesting Officer*  Acting Commissioner of Patents and Trademarks